Figure 1:
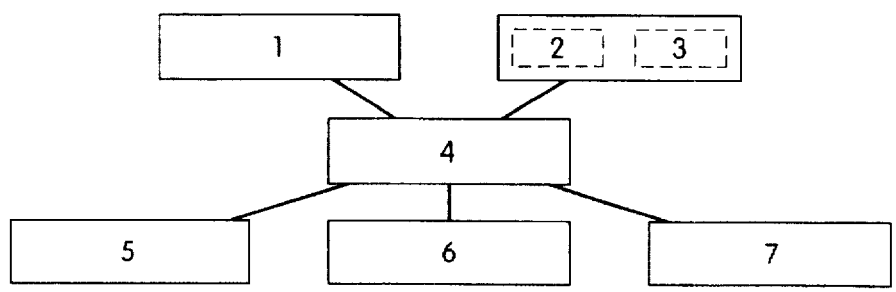

United States Patent [19]

Gnatjuk

[11] Patent Number: 5,749,545
[45] Date of Patent: May 12, 1998

[54] AUTONOMOUS ON-BOARD SATELLITE CONTROL SYSTEM

[76] Inventor: Sevastian Dmitrievich Gnatjuk, ul. Engelsa, 26-42, g.Khimki Moskovskoi obl., Russian Federation

[21] Appl. No.: 505,262

[22] PCT Filed: Nov. 10, 1993

[86] PCT No.: PCT/RU93/00262

§ 371 Date: Aug. 23, 1995

§ 102(e) Date: Aug. 23, 1995

[87] PCT Pub. No.: WO94/18073

PCT Pub. Date: Aug. 18, 1994

[30] Foreign Application Priority Data

Feb. 9, 1993 [RU] Russian Federation ............ 93007754

[51] Int. Cl.$^6$ ................................................ B64G 1/24
[52] U.S. Cl. ........................................................ 244/164
[58] Field of Search ................................. 244/164–171

[56] References Cited

U.S. PATENT DOCUMENTS

| | | | |
|---|---|---|---|
| 5,108,050 | 4/1992 | Maute | 244/171 |
| 5,204,818 | 4/1993 | Landecker | 244/171 |
| 5,277,385 | 1/1994 | Flament | 244/171 |
| 5,452,869 | 9/1995 | Basuthakur et al. | 244/171 |
| 5,508,932 | 4/1996 | Achkar et al. | 244/171 |

FOREIGN PATENT DOCUMENTS 263565  10/1988  France.

OTHER PUBLICATIONS

"Autonomous On–Board Orbit Determination Systems" Astrodynamics Conference, Aug. 20–22, 1984, Seattle, WA.

*Primary Examiner*—Galen L. Barefoot
*Attorney, Agent, or Firm*—Collard & Roe, PC.

[57] ABSTRACT

An autonomous on-board satellite control system is to achieve autonomous orientation control and autonomous determination of the satellite's altitude and location in relation to the Earth's longitude and latitude grid. This is done with the aid of the following elements: an Earth sensor (1), a Pole-star sensor (2), a computer (4), a timing device (6) and actuator units (7). The system also includes a navigational star sensor (3) and a storage device (5), while the computer is designed so as to facilitate supplementary determinations. The orientation of the satellite is controlled by superimposing the general sensory plane (16) of the sensors (1 and 2) with the plane of the angle "center of Earth—satellite—Pole star" which defines latitude. The geovertical (11) rotates about a line to the Pole star (12) as the satellite (8) moves in its orbit (9) and this is equivalent to the revolution of the stars in the field of vision of the sensors (2 and 3). The rotation of the plan containing the lines to the stars (12 and 18) is measured in relation to a reference line (19) whose longitude and angular parameter ("B") are kept in the storage device (5). Inertial longitude is calculated as the sum of the angle of measurement and the right ascension of the Pole star as the base longitude and is converted to the geocentric longitude. The altitude of the plan (16) to the latitudinal plane is calculated as the product of the polar distance of the Pole star and the sine of the angle of measurement, while its development ($\gamma$) when in misalignment with the longitudinal axis (17) is calculated as the product of the angular dimension of the Earth's radius, the sine of the angle is equal to the difference in longitudes of a target point (20) and the point below the satellite and the cosine of the latitude angle.

4 Claims, 3 Drawing Sheets

AUTONOMOUS ON-BOARD SATELLITE CONTROL SYSTEM

Invention relates to astronavigation and satellite angular orientation control and is designed for using at autonomously functioning satellite. Satellite, moving in three-dimensional space has six degrees of freedom. In these environment satellite guide control is performed by navigation and orientation system with the determination of three coordinates of location point: flight longitude, latitude and altitude and three angular orientation coordinates: pitch, roll and yaw.

Active control orientation system of the geostationary satellite, being foreseen as analog, is known.(patent of France N 2637565, 1988).

Mentioned orientation control system of the satellite is characterised by the following. System includes the Earth sensor, Sun sensors, sensor of the Pole star, processing and calculation units, drive motors. System provides three-axis satellite stabilization: east-west, north-south and geocentric. The following sensors are used while orientation control:

pitch and roll: the Earth sensor;

yaw: star sensor.

These different sensors give the output signals, going into data processing networks, that are designed for correction manoeuvres amplitude determination according to this data; manoeuvres are executed by drivers of any known corresponding type (reactive flywheels, inertial flywheels and nozzles). Three satellite orientation angles, including yaw, are being constantly controlled in the working mode.

Errors of the Earth sensor could be used for pitch and roll control without preliminary processing. Angular deviations, corresponding to pitch and roll channels during measurements by the Earth sensor are considered to be equal. System is characterised also by the fact,that in its composition there is a unit, containing the Pole star location evolution model, and this unit is connected with the telemetry unit. Hence, this model parameters are being renewed periodically, basing on the information, receiving from the Earth. In order to control yaw angle, it is necessary to execute the following operations:

basing at the ephemerids, processed by the mentioned unit, satellite location in the inertial coordinate system is calculated;

after that, with the help of the same unit, theoretical coordinates of the Pole star in the star sensor field of view are to be calculated, while this is assumed, that the satellite has ideal orientation (pitch, yaw and roll are equal to zero), yaw error signal is calculated in the processing network, that is equal to the difference of the Pole star location coordinates in the two-dimensional field of view, and basing on this error, yaw control amplitude is to be calculated in order to delete having shift.

Mentioned system has the following, similar to invention, indications while the working mode providing:

analogous devices are being used in the system: the Earth sensor, sensor of the Pole star, computer, actuator organs;

orientation control on pitch and roll channels is provided with the help of the Earth sensor, on yaw channel—by star sensor. Foreseen as analog, mentioned system has the following demerits in the satellite angular position determining relatively to north-south axis (the Earth latitude plane):

system is complicated by using of the unit, containing the Pole star position evolution model;

system for renewing of the mentioned model parameters, depends on data, receiving from the Earth;

system needs in performing of a row of calculation operations in order to calculate the difference between real and theoretical Pole star position coordinates in the star sensor field of view.

Autonomous on-board system of orbit determination (article "Autonomous on-board orbit determination systems", Astrodynamics Conference. Aug. 20–22, 1984. Seattle, Wash.), being foreseen as a prototype, is known.

Mentioned system includes the Earth sensor, Sun sensors, the Pole star sensor,computer, mass memory device, actuator organs. The Earth sensor is pointed into nadir and it forms errors on pitch and roll for orientation control system,that keeps this direction in the limits of the central zone of non-sensitivity. Error signals are proportional to the Earth angular deviations from sensor line of sight on two across directions. Angle between the Earth sensor line of sight and the Sun sensor line of sight directions is measured by potenciometrical sensor of the panel drive-motor, installed on the panel. Angle "the Sun—object—the Earth" is the best observation for orbit determination. Information about the Sun location relatively to the Earth is taken from a file with ephemerides.

The Sun ephemerides are put into the computer as a complicated time functions. If the Sun is in the satellite orbital plane, then angle "the Sun—object—the Earth" directly characterizes true inertional longitude of the satellite. If the Sun is not in the satellite orbital plane, measurement contains some information about orbit inclination components. Best evaluation conditions of the orbit inclination vector correspond to maximal Sun declination, the worst—to zero. If the Sun declination equal to zero,orbit inclination vector components are not observed. In the case, if the angle "the Pole star—object—the Earth" is measured additionally, these components could be observed independently of the "light source" declination. In the case of determining according to the Pole star, it is considered, that additional measurements of "the Pole star—object—the Earth" angle are executed with the same frequency (1/30 min), as "the Sun—object—the Earth" base angle measurements. Integrated data, based on both measurements sequence, mattes errors to be observing. Mentioned measurements are referenced in time Information on a present satellite location could be received from the equations of satellite moving. Integration of motion equations is performed with the fixed pitch, equal to 30 minutes. 30 minutes interval was chosen from the nominal system state correction that is performed every 30 minutes.

Mentioned system has the following, similar to invention indications:

analogous devices are being used in the system, such as: the Earth sensor, the Pole star sensor, computer, storage device, timing device, actuator units;

determination of satellite latitude is performed by "the Earth centre—satellite—the Pole star" angle measurement;

orientation control on pitch and roll channels is provided by the Earth sensor, on yaw channel—it is presumed the Pole star sensor using.

Foreseen as a prototype, mentioned system has the following disadvantages in satellite location parameters determination:

Sun navigation reference point ephemerides are being input as a complicated functions of time;

navigation measurements could not be performed continuously due to periodically satellite shadowing by the Earth shadow;

direct determining of the satellite inertial longitude is possible only in one case, when angular misalignment of "the Sun—object—the Earth" angle and orbit planes is absent. In all other cases additional "the Earth centre—satellite—the Polar star" angle measurements and additional calculations are necessary.

It should be noted, that mentioned system, similar to mentioned above analog, needs to correspond to the cycle of preliminary calculations in order to calculate difference of real and theoretical Pole star coordinates in the star sensor field of view.

An object is to create the satellite on-board guide control system, that could provide orientation autonomous control and antonomous determination of the satellite angular location relatively to the Earth's latitude-longitude network, by:

creation of the joint plane of sensitivity of the system sensors;

combining of this plane with such an external plane, rotation of which in the inertial space occurs through orbital movement;

measurement of the mentioned turning by input into the system sensor;

calculation by definite way the read-out base of turning, and base parameters containing in storage device, including into the system;

calculation of inertial longitude as a sum of measured rotation angle and base longitude, and also satellite angular position according to function of inertial longitude and overturn of the system sensors general plane of sensitivity relatively to the satellite structure, performed by computer with the possibility of determination of the mentioned parameters. The system being used, contains the Earth sensor, the Pole star sensor, computer, timing device and actuator units, with the help of which control of angular orientation and determination of location point latitude is performed, and in which computer is designed with the possibility of additional determinations, and in the composition of which there are navigational star sensor, storage device and their outputs are connected with the corresponding inputs of computer. Orientation control is being performed while combining of the Earth and the Pole star sensors general sensitivity plane, containing the satellite longitudinal axis, with the plane "the Earth centre—satellite—the Pole star" at the base of measured angular misalignments in pitch, roll and yaw channels and formed corresponding control signals. While this, computer determines satellite location point inertial longitude, according to azimuth rotation angle in the field of view of star sensors, chosen navigation star around direction "satellite—the Pole star" relatively to the read-out base and taking into account inertial longitude of this base, parameters of which are kept is a storage advice. Read-out base, as a plane, containing in the corresponding field of view directions "satellite—the Pole star" and "satellite—navigation star", characterizing by inertial longitude, that is equal to the Pole star right ascention, is overturned relatively to general sensitivity plane of the Earth and the Pole star sensors to an angle, that is equal to the angle between the plane, containing directions "the Earth centre—the Pole star", "the Earth centre—the Pole of the World" and "the Earth centre—the Pole star" and "the Earth centre-navigational star".

Computer also determines angular position of the general sensitivity plane of the Earth and the Pole stair sensors relatively to the Earth latitude plane according to inertial longitude function, and its overturn relatively to satellite structure under the angular misalignment of geocentric vertical and the satellite longitude axis, pointed onto the target paint, determines as an angle, that is equal to those misalignment component, which depends on the difference of target and undersatellite points and the Earth angular dimension.

One of the characterized features of proposed set of devices, including orientation control system, and navigation control system, is the different use of the star sensors: one of the sensors is used inside the navigation circuit, and the other in the navigation circuit and in orientation circuit as well; the second feature—star positions, coordinated on two sensor's axes, are used for azitmuth turning of the plane, containing directions onto the stars. Independence of the system in the angular orientation control mode is being achieved due to control performing under keeping the directions to the Pole star and the Earth centre in one general sensory sensitivity plane. Under the conditions, when there is known angular misalignment between directions to the Pole of the World and to the Pole star in 48 angular minutes, determining of the external coordinate system (angular position of the satellite relatively to the north-south axis) according to the traditional experience is being previous to yaw orientation control.

Original, in compareness with this experience, is the other sequence, when yaw control is being previous to the satellite angular position determination relatively to the Earth latitude plane, and it is a device for such determination.

Depending on type of using orbits, on duration of the working stage and its location, angle between directions "satellite—the Earth centre" and "satellite—the Pole star" could change in a wide range.

Keeping directions to the Pole star and to the Earth centre in one general plane of the Earth and the Pole star sensors causes oscillation of this plane relatively north-south axis (relatively to the Earth latitude plane) with the amplitude at a stationary orbit ±48 arc. minutes in the day cycle.

Current angular position of the satellite relatively to north-south axis depends on current inertial longitude of the satellite.

While the satellite longitude changing during the orbital motion relatively the base value, for example, on 6 h, 12 h or 18 h, amplitude of the angular oscillation will be −48, 0, +48 arc. minutes correspondingly.

In the common case, necessary angular position is being determined by multiplication of the Pole star polar distance onto the sine of the angle, value of which is equal to the difference of the values of inertial longitude and the Pole star right ascention.

Hence, the analogous satellite disadvantages are corrected.

Due to proposed orientation control on yaw channel, geocentric vertical is projected onto the sky sphere, forming "vertical" (circle line in projection).

Character feature of this "vertical" is its rotation around the direction onto the Pole star, due to the orbital movement, that in the satellite connected coordinate system is equivalent to the star field rotation around it.

This rotation, being the source of navigational information, is measured by the input into the system sensor. In this case, the prototype disadvantages are taken out, that are usual while the Sun navigation, and that could be explained by the known angular misalignment of the eclipce and equator planes, by the periodical shadowing of the stationary satellite by the Earth shadow and by complication of the Sun ephemerides input.

Position of previously chosen navigation and the Pole stars in the corresponding field of view like the position of the plane, containing directions "satellite-navigation star" and "satellite—the Pole star", is measured relatively "vertical" by an angle that characterizes the inertial longitude. Moment of turning, when "vertical" coincides with the plane, containing directions "the Earth centre—the Pole star" and "the Earth centre—the Pole of the World", is rated, while the determination of the readout base, being characterized by the right ascent of the Pole star and the angle relatively to plane "vertical", containing directions onto navigational and the Pole star. Spherical triangle is used for determination of the desired angle, vertexes of which are the Pole of the World, the Pole star and navigational star. Value of this angle could be determined from Neper equations:

$$tg\frac{B+C}{2}\cos\frac{\beta+c}{2} = ctg\frac{A}{2}\cos\frac{\beta-c}{2},$$

$$tg\frac{B-C}{2}\sin\frac{\beta+c}{2} = ctg\frac{A}{2}\sin\frac{\beta-c}{2},$$

where:

"B"—is desired angle;

"A"—angle, vertex of which is the Pole of the World, and which is equal to the difference of right ascentions of the Pole and navigational stars, measured in degrees;

"C"—angle, vertex of which is navigational star;

"c"—polar distance of the Pole star;

"b"—polar distance of navigational star.

Hence, inertial longitude is determined by the sum of measured relatively to turning base navigational star and base longitude. Its transferring into geocentric is performed by timing device according to known methodics.

Target misalignment of geocentric vertical and the satellite longitude axis, oriented to the target point, gives the overturn of the general sensory sensitivity plane relatively to satellite base,and as a result turning of the readout base. This overturn is equal to those misalignment component, which depends on the difference of target and undersatellite points and the Earth angular dimension. This component could be determined as multiplication of the Earth radius annular dimension on sine of the angle, equal to difference of mentioned longitudes, and on cosine of latitude. The component is changed with the latitude changing: at the latitude in 90 degrees, it is equal to zero.

At FIG. 1, true simplified structure of the guide control system is shown, where 1—the Earth sensor, 2—3—the Pole star and navigation star sensors, 4—computer, 5—storage device 6—timing device, 7—actuator units.

Figure 2:
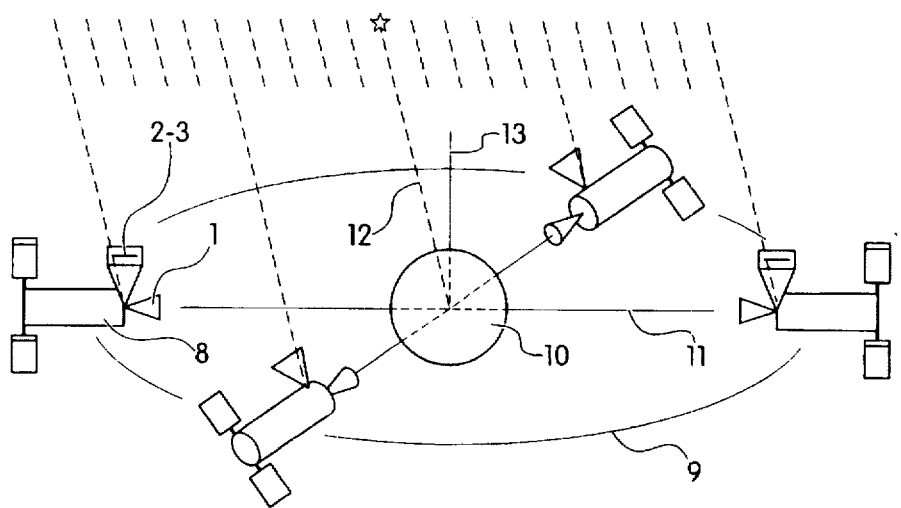

At FIG. 2 satellite, stabilized relatively to geocentric vertical and direction on to the Pole star, is shown schematically, where 8—satellite, 9—orbit, 10—the Earth, 11—geocentric vertical, 12—direction to the Pole star, 13—direction to the Pole of the World.

Figure 3:
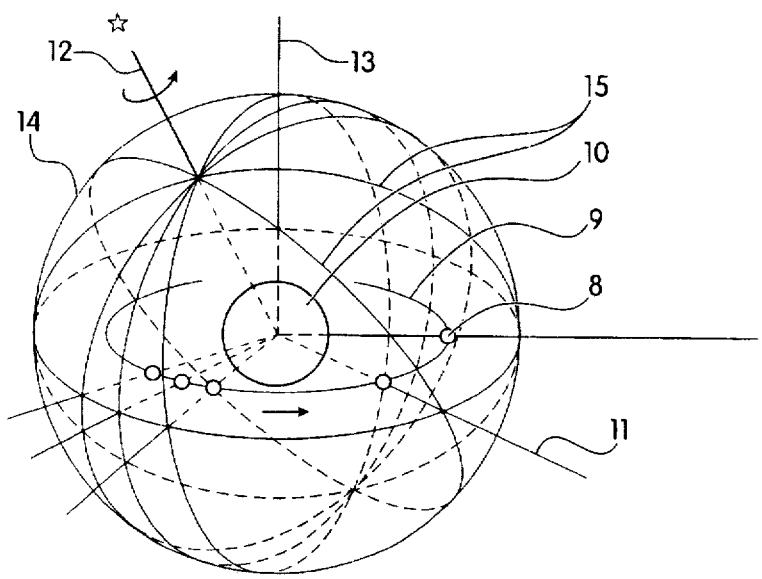

At FIG. 3 "vertical" rotation 3 a plane, containing geocentric vertical and the direction to the Pole star, due to the satellite orbital movement, is shown, where 14—the sky sphere, 15—"vertical".

Figure 4:
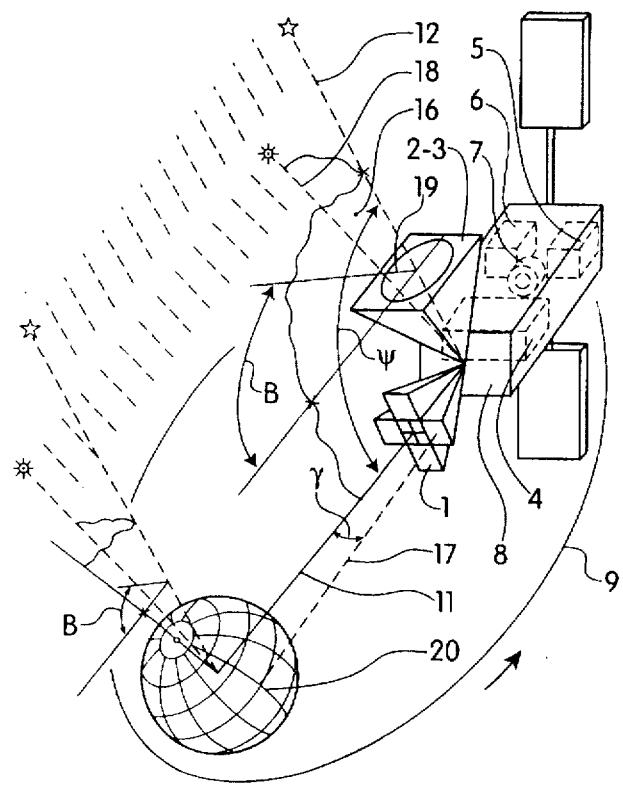

At FIG. 4 determination of the satellite inertial longitude on, the angular position relatively to general sensory sensitivity plane of the Earth and Pole star sensors, in the plane containing directions to navigational and the Pole stars, and inertial longitude readout base are shown, where 16—general sensory sensitivity plane, 17—satellite longitudinal axis, 18—direction to navigational star, 19—readout base, 20—target point, "B"—angular parameter of the readout base, "γ"—angular misalignment of the geocentric vertical and longitudinal axis.

Figure 5:
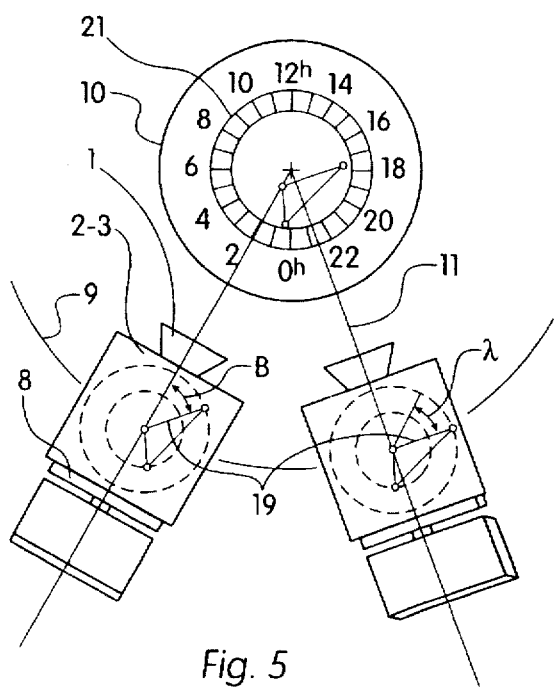

At FIG. 5 view from the side of the Pole of the World is shown with the conventional picture of a map with three stars of North Polar row (including the Pole star), illustrating the determination of inertial longitude readout base, where 21—map of the stars of North Polar row.

Figure 6:
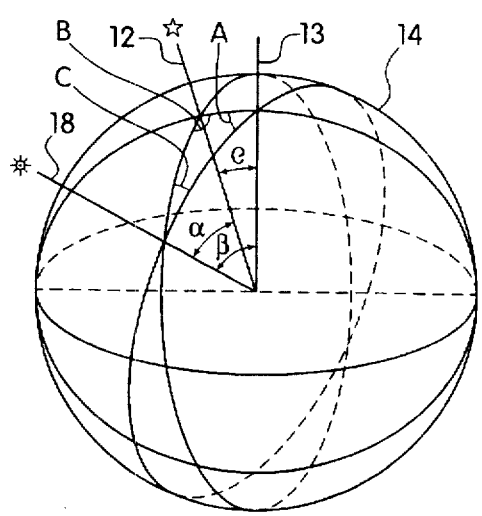

FIG. 6 shows spherical triangle, necessary for determination of the readout base angular parameter, where "B"—desired angle, "A"—angle, vertex of which is the Pole of the World, and which is equal to the difference of the right ascentions of navigational and the Pole stars, measured in degrees, "C"—angle, vertex of which is navigational star, "c"—polar distance of the Pole star, "b"—polar distance of navigational star.

Figure 7:
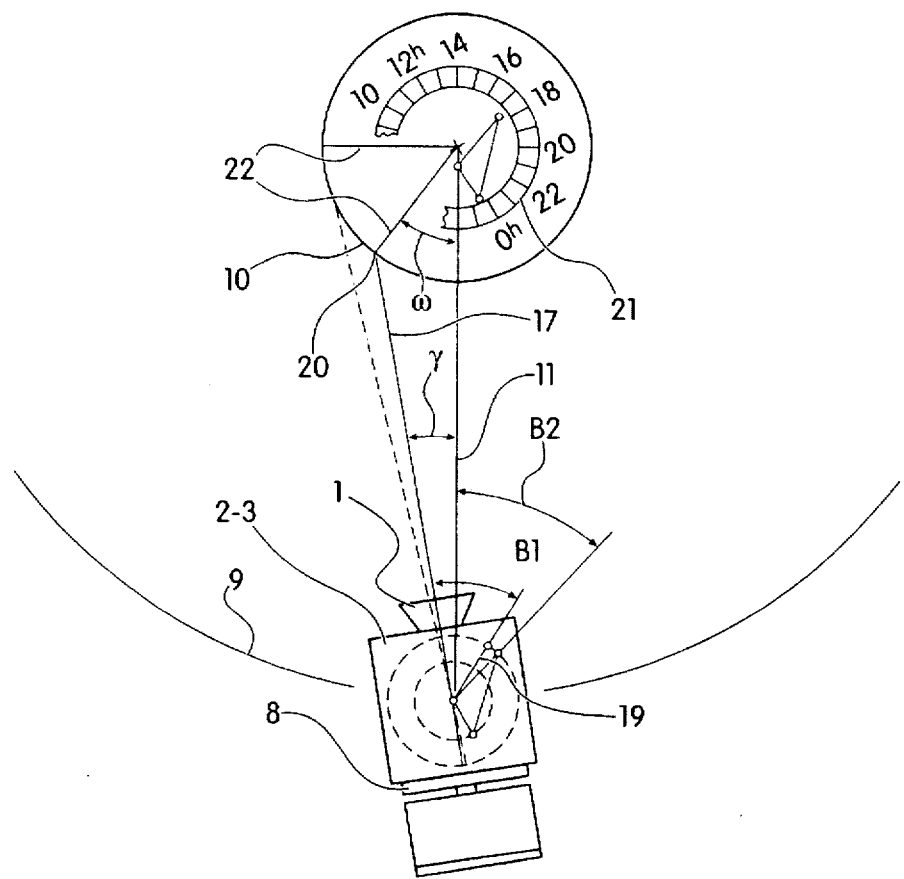

At FIG. 7, position of the readout base relatively to satellite structure during angular misalignment of geocentric vertical and longitudinal axis, determined from the triangle, is shown, where 22—angular dimension of the Earth radius, "ω"—angle, which is equal to the difference of the target and undersatellite points longitude difference.

Figure 8:
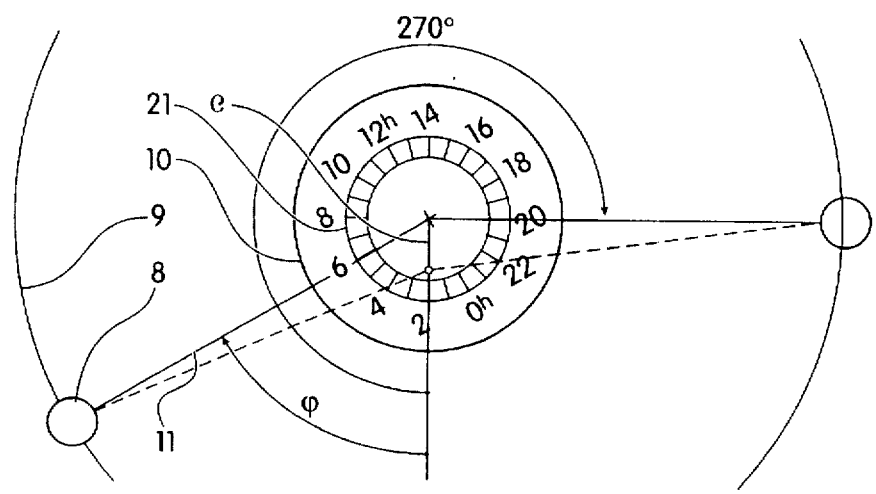

At FIG. 8 function of the Pole star polar distance angular dimension of the satellite location point inertial longitude is shown, where 23—polar distance of the Pole star ("c", "θ"—angle, which is equal to the difference of values of the current inertial longitude and the Pole star right ascention.

The best variant of invention using is a guide control system of the satellite at a stationary orbit.

At this orbit changing of the angle "the Earth centre—satellite—the Pole star", determining latitude of location point, is going in not very large interval, that doesn't put additional requirements to sensor's field of view dimensions. System uses: double-coordinate sensor of the Earth 1, wide field double-coordinate star sensor 2–3, computer 4, storage device 5, timing device 6, actuator units 7.

Using of one sensor, working on the Pole and navigational stars, simplifies structural composition of the system. An external coordinate system, containing the Earth centre, satellite and the Pole star is used, and for the determination of it special software is not needed.

While combining of this plane with the general sensitivity plane 16, geocentric vertical 11, while the satellite 8 moving along the orbit 9, is rotated around the direction onto the Pole star, that is equivalent to stars rotation in the sensor 2–3 field of view, measuring this rotation.

Turn of the plane, containing directions to stars 12 and 18, is measured relatively readout base 19, longitude and previously calculated according to definite methodics angular parameter "B", which are kept in the storage device. Inertial longitude is defined by sum of the measuring angle and the Pole star right ascention, as a base longitude, and transfers into geocentric by known method. Angular position of the general sensitivity plane to the Earth latitude plane, due to the Pole star 23 polar distance, is being determined by computer as multiplication of polar distance on "θ" angle sine, value of which is equal to value difference of the current inertial longitude and the Pole star right ascention. Asimutal overturning of the general sensitivity plane relatively to the satellite structure under the target angular misalignment "γ" of geocentric vertical and longitudinal axis 17, oriented on to the target point 20, is determined by the computer as multiplication of the Earth radius angular dimension 22 on "ω" angle sine, that is equal to longitude difference of the target and undersattelite points, (and on cosine of latitude). Latitude component of the misalignment angle could be determined analogously. In addition, according to the difference of the true revolution period and star days duration, necessary orbit correction ignition pulse could be determined, and while determination of the latitude, according to the angle "the Earth centre—satellite—the Pole star",—to take into account correction, due to the Pole star polar distance, and value of which depends on inertial longitude of the location point. After checking of the on-board time scale with the general single scale, satellite is to be launched into the orbit and oriented by known programmed overturns to the Earth. After catching the Earth by the field of view of the rigid reinforced on-board satellite sensor, geocentric vertical is being built. The sensor principle of work is based on the Earth infrared radiation.

Data, necessary for measuring of the deviation angle of geocentric vertical from the sensitivity plane (plane of pitch and roll), is processed while observing the two diameterally-opposite points of the Earth infrared horizon by method of plane scanning of the Earth disc by moment field of view. Scanning mirror provides by electromechanical drive motor the oscillation movement of sensor field of view relatively to the Earth disc. With corresponding pitch on scanning angle, data pulses are being processed, which then should go to computer. Difference of the numbers of data pulses is the criteria of the sensitivity plane deviation angle of geocentric vertical direction. Receiving in the computer coming signals are processed by corresponding method and control function as a sum of signals, proportional to being controlled value, differential and integral of it, is formed. After that, correspondingly to control function, signals should be amplified and converted before going to the actuator units.

After deviations executing on pitch and roll, catching of the Pole star by the field of view of rigid reinforced on board the satellite star sensor is performed. For measurements of star's coordinates of the fixed brightness band, sensor with the corresponding field of view and photoreceiver of corresponding sensitivity is required. Sensor, corresponding to these requirement's, and produced by the industry, is used. While the voltage is going, sensor, searching the stars, looks through all fields of view.

Star images are projected by lens optical sensor system onto the photoreceiver, (a CCD type instrument). While searching, sensor detects stars, brightness of which exceeds the input. With the help of a special algorythm, choosing of the Pole and navigational stars is performed.

After their detecting, sensor performs tracking and periodically calculates their angular positions. Measured in the sensor coordinate system, star coordinates are given to computer.

In computer, control function on the Pole star keeps in the general sensory sensitivity plane while orientation control on yaw channel is formed, and desired, angles are determined.

I claim:

1. Autonomous on-board satellite control system, comprising
    an Earth sensor having an output, a Pole star sensor having an output, a computer having inputs which are connected with said output of said Earth sensor and said output of said Pole star sensor and which determines angular misalignments between satellite internal building axes and external coordinate system axes, and forms control signals for supporting the input relative to location of said coordinate system axes;
    a timing device having an output which is connected with a computer input;
    actuator units having an input which is connected with a computer output;
    a navigational star sensor and a storage device of inertial longitude readout base parameters, and said parameters include the Pole star right ascension and an angle relative to the Pole star, and an Earth sensor general sensitivity plane, that is equal to an angle between the plane, containing an axis connecting the Earth center with the Pole star and an axis connecting the Earth center with the Pole of the World;
    the plane, containing an axis connecting the Earth center with the Pole star and the Earth center with the navigational star;
    said computer making a satellite location point latitude determination on the angle of the Earth center to satellite to the Pole star and providing an angular orientation control for the yaw control;
    said computer measuring corresponding angular misalignments and forming control signals, during which, general sensitivity plane of the Earth and the Pole star sensors, containing satellite longitudinal axis is combined with the plane, containing the Earth center, satellite and the Pole star;
    said computer making a determination of satellite location point inertial longitude according to azimuth angle of chosen navigational star turning around the direction of satellite to the Pole star, to be counted in corresponding field of view from the base angular position of the plane, containing directions satellite to the navigational star and satellite to the Pole star, taking into account inertial longitude of this readout base, such that outputs of the navigational star sensor and the storage device are connected with the corresponding computer inputs; and
    said computer calculating a correction, determined as a multiplication of polar distance of the Pole star onto cosine of the angle, equal to the difference of the value of current inertial longitude and right ascension of the Pole star.

2. System according to claim 1,
    wherein the Earth sensor and the Pole star sensor general sensitivity plane is located within an angle to the satellite longitudinal axis, directed to a target point;
    said computer determining said angle by multiplication of Earth radius angular dimension onto the sine of said angle, equal to the target and undersatellite points longitude difference, and on cosine of the latitude angle; and
    said computer determining of geocentric longitude as the sum of inertial longitude and multiplication of the Earth revolution velocity onto on-board star time.

3. System according to claim 1,
    wherein said computer determining the Earth and the Pole star sensors general sensitivity plane angular position relative to the Earth latitude plane by multiplication of the Pole star polar distance onto the sine of an angle, equal to difference of values of the current inertial longitude and the Pole star right ascension.

4. System according to claim 1,
    wherein the joint sensitivity plane of the Earth sensor and the Pole star sensor is placed at an angle to the longitudinal satellite axis, and directed to the target point;
    said computer determining the longitudinal component of the angle between direction to undersatellite and direction to target points as a multiplication of the Earth radius angular dimension onto sine of an angle, which is equal to the difference of longitudes of target and undersatellite points, and onto cosine of the target point latitude angle; and said computer determining latitude component as a multiplication of the Earth radius angular dimension onto sine of an angle, which is equal to the difference in latitude of the target and the latitude of the undersatellite points.

* * * * *